(12) United States Patent
Wada et al.

(10) Patent No.: US 6,780,218 B2
(45) Date of Patent: Aug. 24, 2004

(54) PRODUCTION PROCESS FOR NIOBIUM POWDER

(75) Inventors: Kouichi Wada, Kanagawa (JP); Yasuo Tsumita, Kanagawa (JP); Toshiya Kawasaki, Kanagawa (JP); Kazumi Naito, Chiba (JP); Kazuhiro Omori, Kanagawa (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 23 days.

(21) Appl. No.: 10/175,144

(22) Filed: Jun. 20, 2002

(65) Prior Publication Data

US 2003/0089197 A1 May 15, 2003

Related U.S. Application Data

(60) Provisional application No. 60/300,853, filed on Jun. 27, 2001.

(30) Foreign Application Priority Data

Jun. 20, 2001 (JP) .................................... P2001-185694

(51) Int. Cl.[7] .............................. B22F 1/00; B02C 23/18
(52) U.S. Cl. ............................. 75/255; 75/354; 241/15; 241/16
(58) Field of Search .......................... 75/354, 255, 254, 75/245; 241/15, 16; 361/303

(56) References Cited

U.S. PATENT DOCUMENTS

| | | | | | |
|---|---|---|---|---|---|
| 3,363,846 A | * | 1/1968 | Eck | .............................. | 241/15 |
| 3,627,862 A | * | 12/1971 | West et al. | .................... | 264/71 |
| 4,018,633 A | * | 4/1977 | Holland | ........................ | 241/23 |
| 4,647,304 A | * | 3/1987 | Petkovic-Luton et al. | .... | 75/354 |
| 5,407,458 A | * | 4/1995 | Konig et al. | ................... | 75/255 |
| 6,165,623 A | * | 12/2000 | Fife et al. | ................... | 428/472 |
| 6,171,363 B1 | * | 1/2001 | Shekhter et al. | .............. | 75/369 |
| 6,261,337 B1 | * | 7/2001 | Kumar | ........................ | 75/255 |

FOREIGN PATENT DOCUMENTS

| EP | 1 291 100 A1 | 3/2003 |
|---|---|---|
| WO | WO 01/91953 A1 | 5/2001 |

* cited by examiner

*Primary Examiner*—Ngoclan T. Mai
(74) *Attorney, Agent, or Firm*—Sughrue Mion, PLLC

(57) ABSTRACT

A niobium hydride or niobium hydride alloy is ground at a temperature of −200 to 30° C. in the presence of a dispersion medium to obtain a niobium powder for capacitors, having a low oxygen content, the niobium powder for capacitors is granulated to obtain a niobium granulated product for capacitors, having an average particle size of 10 to 500 µm, the niobium powder or granulated powder for capacitors is sintered to obtain a sintered body, and a capacitor is fabricated by forming a dielectric material on the surface of the sintered body and providing another part electrode on the dielectric material, whereby a capacitor having good LC characteristics and less dispersed in the LC characteristics is obtained.

8 Claims, No Drawings

PRODUCTION PROCESS FOR NIOBIUM POWDER

CROSS REFERENCE TO RELATED APPLICATIONS

This application is an application filed under 35 U.S.C. §111(a) claiming benefit pursuant to 35 U.S.C. §119(e)(1) of the filing date of the Provisional Application No. 60/300,853 filed Jun. 27, 2001 pursuant to 35 U.S.C. §111(b).

TECHNICAL FIELD

The present invention relates to a process for producing a niobium powder for capacitors. The present invention also relates to a niobium powder for capacitors, which is reduced in the oxygen content in niobium and thereby can provide a capacitor having a large capacitance per unit mass and good leakage current characteristics; a sintered body using the powder; and a capacitor using the sintered body.

The niobium for capacitors means a material mainly comprising niobium and usable for the production of capacitors.

BACKGROUND ART

Capacitors for use in electronic instruments such as cellular phone and personal computer are demanded to have a small size and a large capacitance. Among these capacitors, a tantalum capacitor is preferred because of its large capacitance for the size and good performance. In this tantalum capacitor, a sintered body of tantalum powder is generally used for the anode moiety. In order to increase the capacitance of the tantalum capacitor, it is necessary to increase the mass of the sintered body or to use a sintered body increased in the surface area by pulverizing the tantalum powder.

The method of increasing the mass of the sintered body necessarily involves enlargement of the capacitor shape and cannot satisfy the requirement for downsizing. In the method of pulverizing tantalum powder to increase the surface area, the pore size of the tantalum sintered body decreases and closed pores increase, as a result, impregnation of the cathode agent in the later step becomes difficult. As one of means for solving these problems, a capacitor using a sintered body of a material having a dielectric constant larger than that of tantalum is being studied. The material having a larger dielectric constant includes niobium and a niobium alloy.

With respect to the method for producing a niobium powder for capacitors, JP-A-55-157226 (the term "JP-A" as used herein means an "unexamined published Japanese patent application") discloses a method for producing a sintered element for capacitors by molding agglomerated powder into niobium powder having a particle size of 2.0 μm or less and sintering the niobium powder. However, details on the properties of the capacitor are not described in this patent publication.

U.S. Pat. No. 4,084,965 discloses a capacitor using a sintered body of niobium powder of 5.1 μm obtained by hydrogenating and grinding a niobium ingot. However, the capacitor disclosed is large in the leakage current (hereinafter sometimes simply referred to as "LC") and the practicability thereof is low.

JP-A-10-242004 discloses a technique of partially nitriding niobium powder and thereby improving the LC value. However, when a high-capacitance capacitor is produced by using a niobium sintered body of niobium powder having a fine particle size, a capacitor having a peculiarly large LC value appears in some cases.

DISCLOSURE OF THE INVENTION

The present inventors have found that the dispersion of LC value is ascribable to oxygen contained in a niobium powder for capacitors and, for example, when a niobium powder for capacitors, having a low oxygen content obtained by grinding a niobium hydride or a niobium hydride alloy at a low temperature is used, the LC characteristics can be improved. The present invention has been accomplished based on this finding. More specifically, the present invention is composed of the following matters.

(1) A process for producing a niobium powder for capacitors, comprising a step of grinding a niobium hydride or a niobium hydride alloy in the presence of a dispersion medium, wherein the grinding temperature is from −200 to 30° C.

(2) The process for producing a niobium powder for capacitors as described in 1 above, which comprises a step of dehydrogenating the niobium hydride powder or niobium hydride alloy powder at a temperature of 100 to 1,000° C. after the grinding.

(3) The process for producing a niobium powder for capacitors as described in 1 or 2 above, wherein the grinding temperature does not elevate during the grinding.

(4) The process for producing a niobium powder for capacitors as described in any one of 1 to 3 above, wherein the dispersion medium is at least one member selected from the group consisting of water, an organic solvent and a liquefied gas.

(5) A niobium powder for capacitors, obtained by the production process described in any one of 1 to 4 above.

(6) The niobium powder for capacitors as described in 5 above, wherein the average particle size of the niobium powder for capacitors is from 0.01 to 10 μm.

(7) The niobium powder for capacitors as described in 5 or 6 above, wherein the BET specific surface area of the niobium powder for capacitors is from 0.5 to 40 m$^2$/g.

(8) The niobium powder for capacitors as described in any one of 5 to 7 above, wherein the bulk density of the niobium powder for capacitors is from 0.5 to 4 g/ml.

(9) The niobium powder for capacitors as described in any one of 5 to 8 above, wherein the pore size peak of the niobium powder for capacitors is from 0.01 to 7 μm.

(10) The niobium powder for capacitors as described in any one of 5 to 9 above, wherein the oxygen content of the niobium powder for capacitors is 2.5 mass % or less.

(11) The niobium powder for capacitors as described in any one of 5 to 10 above, wherein the niobium powder for capacitors further comprises at least one element selected from the group consisting of boron, nitrogen, carbon and sulfur.

(12) A niobium granulated product for capacitors, having an average particle size of 10 to 500 μm, which is obtained by granulating the niobium powder for capacitors described in any one of 5 to 11 above.

(13) The niobium granulated product for capacitors as described in 12 above, wherein the BET specific surface area of the niobium granulated product for capacitors is from 0.5 to 40 m$^2$/g.

(14) The niobium granulated product for capacitors as described in 12 or 13 above, wherein the pore size peak of the niobium granulated product for capacitors is within the range from 0.01 to 500 μm.

(15) The niobium granulated product for capacitors as described in any one of 12 to 14 above, wherein the bulk density of the niobium granulated product for capacitors is from 0.05 to 4 g/ml.

(16) The niobium granulated product for capacitors as described in any one of 12 to 15 above, wherein the oxygen concentration of the niobium granulated product for capacitors is 3 mass % or less.

(17) A sintered body obtained by sintering the niobium powder for capacitors described in any one of 5 to 11 above and/or the niobium granulated product for capacitors described in any one of 12 to 16 above.

(18) A capacitor comprising the sintered body described in 17 above as one part electrode, a dielectric material formed on the surface of the sintered body, and another part electrode provided on the dielectric material.

(19) The capacitor as described in 18 above, wherein the dielectric material is mainly composed of niobium oxide.

MODE FOR CARRYING OUT THE INVENTION

The practical embodiment of the present invention is described below.

It is a known technique that a niobium ingot is hydrogenated and ground using an appropriate grinder in the presence of an appropriate dispersion medium (see, U.S. Pat. No. 4,084,965). However, when a niobium powder for capacitors is produced by this method, the capacitor using the niobium powder suffers from high LC value and large dispersion of LC value and lacks in reliability. This is considered ascribable to the fact that oxygen present in the dispersion medium reacts with or adsorbs to niobium hydride due to heat generated during grinding and at the manufacture of a sintered body, niobium oxide is produced by the crystallization and adversely affects particularly the LC. Accordingly, for improving the LC characteristics, it is important to suppress the oxygen amount in the niobium hydride powder. In order to suppress the oxygen amount in the niobium hydride powder, for example, a method of preventing the elevation of temperature during grinding may be used. This applies also to a niobium hydride alloy powder.

In the present invention, for example, a niobium hydride or a niobium hydride alloy is ground at a temperature of −200 to 30° C. in the presence of an appropriate dispersion medium, whereby a niobium hydride powder or niobium hydride alloy powder reduced in the oxygen content and capable of providing a capacitor having good LC characteristics can be obtained. In the above-described temperature range, as the temperature is lower, the effect of giving a low oxygen content and a good LC value is higher, however, the grinding at an extremely low temperature requires excessively large grinding equipment and costs highly. Accordingly, the temperature is preferably from −40 to 10° C. In order to prevent the increase of oxygen content in the ground product, the temperature during grinding is preferably not elevated. In this meaning, it is more preferred to keep constant or lower the temperature during grinding in the range from −200 to 30° C.

Examples of the dispersion medium which can be suitably used include water, an organic solvent and a liquefied gas. The dispersion medium is preferably used after thorough degassing. Examples of the organic solvent which can be suitably used include alcohols, ethers, cellosolves, esters, aliphatic hydrocarbons and halogenated hydrocarbons. A dispersion medium which does not solidify at the grinding temperature is preferred. Preferred examples of the liquefied gas include liquid nitrogen and liquid argon.

Examples of the starting material of the niobium powder for capacitors of the present invention include niobium and/or a niobium alloy. The alloy component other than niobium in the niobium alloy is at least one member selected from the group consisting of lithium, sodium, potassium, rubidium, cesium, francium, beryllium, magnesium, calcium, strontium, barium, radium, scandium, yttrium, lanthanum, cerium, praseodymium, neodymium, samarium, europium, gadolinium, terbium, dysprosium, holmium, erbium, vanadium, tantalum, chromium, molybdenum, tungsten, manganese, rhenium, iron, ruthenium, osmium, cobalt, rhodium, iridium, nickel, palladium, platinum, copper, silver, gold, zinc, cadmium, mercury, boron, aluminum, gallium, indium, thallium, carbon, silicon, germanium, tin, lead, phosphorus, arsenic, antimony, bismuth, selenium, tellurium, polonium and astatine.

The grinder, for example, the grinder using a grinding medium is suitably a bead mill. Examples of the material for the grinding medium include stainless steel, zirconia, niobium, ZTA (alumina-reinforced zirconia) and alumina. Among these, preferred are zirconia and niobium.

The obtained niobium hydride powder or niobium hydride alloy powder can be formed into a powder material by drying the ground product using a known drying method. The powder material obtained as such usually has an average particle size of 0.01 to 10 μm, a BET specific surface area of 0.5 to 40 $m^2$/g, a bulk density of 0.5 to 4 g/ml and a pore size peak of 0.01 to 7 μm.

The oxygen amount in the thus-obtained niobium hydride powder or niobium hydride alloy powder of the present invention is usually 50,000 ppm or less, but in order to more improve the LC characteristics, the oxygen amount is preferably from 2,000 to 25,000. The oxygen amount used in the present invention is a value measured using EGMA-620W manufactured by Horiba Seisakusho K. K. and when a slurry is directly measured, the oxygen amount is a value calculated in terms of dry powder from the slurry concentration.

The niobium hydride powder or niobium hydride alloy powder of the present invention may be sintered as it is to manufacture a sintered body or may be dehydrogenated at a temperature of 100 to 1,000° C. and used as a niobium powder or a niobium alloy powder. In order to improve the leakage current value of these niobium hydride powder, niobium hydride alloy powder, niobium powder and niobium alloy powder, a part of such a niobium powder may be treated by nitridation, boronization, carbonization or sulfudization. The powder may comprise any of nitride, boride, carbide and sulfide obtained by the treatments of nitridation, boronization, carbonization and sulfudization. These nitride, boride, carbide and sulfide may also be contained in combination of two, three or four thereof.

The sum total of the bonded amounts thereof, that is, nitrogen, boron, carbon and sulfur contents, varies depending on the particle size, shape, other alloy components and abundance of other alloy components in each powder material, however, in the case of a powder having an average particle size of approximately from 0.01 to 10 μm, the sum total is from 0 to 200,000 ppm. If the sum total exceeds 200,000 ppm, the capacitance characteristics are deteriorated and the fabricated capacitor is not suitable as a capacitor. In view of optimal LC and capacitance, the sum total is preferably from 50 to 10,000 ppm, more preferably from 200 to 20,000 ppm.

The niobium hydride powder, niobium hydride alloy powder, niobium powder or niobium alloy powder for capacitors of the present invention may be used after granulating the powder into an appropriate shape or may be used by mixing an appropriate amount of non-granulated niobium powder after the granulation.

Examples of the granulation method include a method where a non-granulated partially nitrided niobium powder is allowed to stand in a highly reduced pressure, heated to an appropriate temperature and then cracked, and a method where a non-granulated or granulated partially nitrided niobium powder is mixed with an appropriate binder such as camphor, polyacrylic acid, polymethyl acrylate and polyvinyl alcohol, and a solvent such as acetone, alcohols, acetates and water, and then cracked. These methods may be suitably used also for niobium hydride powder, niobium powder, niobium hydride alloy powder and niobium alloy powder.

The niobium granulated product or niobium alloy granulated product granulated as such is improved in the press-molding property at the production of a sintered body. The average particle size of the granulated powder is preferably from 10 to 500 µm. If the average particle size of the granulated powder is less than 10 µm, the powder partially undergoes blocking and deteriorates in the fluidity into a mold, whereas if it exceeds 500 µm, the molded article after the press-molding is readily broken. The average particle size of the granulated product is more preferably from 30 to 250 µm because a cathode agent can be easily impregnated at the manufacture of a capacitor after sintering the press-molded article. The granulated product obtained as such usually has a BET specific surface area of 0.5 to 40 m²/g, a bulk density of 0.5 to 4 g/ml, a pore size peak of 0.01 to 500 µm and an oxygen content of 5 mass % or less.

The niobium sintered body or niobium alloy sintered body for capacitors of the present invention is produced by sintering the above-described powder material or granulated product. The production method of the sintered body is not particularly limited. However, for example, a lead wire comprising a valve-acting metal such as niobium and tantalum and having an appropriate shape and length is prepared and this lead wire is integrally molded at the press-molding of the above-described powder or granulated powder while allowing a part of the lead wire to be inserted into the inside of the molded article, so that the lead wire can work out to an outgoing lead of the sintered body. After press-molding the powder or granulated product into a predetermined shape, the press-molded article is heated at 500 to 2,000° C., preferably from 900 to 1,500° C., more preferably from 900 to 1,300° C., for 1 minute to 10 hours under a pressure of $10^{-5}$ to $10^2$ Pa, whereby a niobium sintered body or niobium alloy sintered body for capacitors can be obtained.

Using this sintered body as one part electrode, a capacitor can be manufactured by interposing a dielectric material between this electrode and another part electrode. The dielectric material used here for the capacitor is preferably a dielectric material mainly comprising niobium oxide. The dielectric material mainly comprising niobium oxide can be obtained, for example, by chemically forming the niobium sintered body as one part electrode in an electrolytic solution. For chemically forming the niobium electrode in an electrolytic solution, an aqueous protonic acid solution is generally used, such as an aqueous 0.1 mass % phosphoric acid solution, an aqueous sulfuric acid solution, an aqueous 1 mass % acetic acid solution and an aqueous 1 mass % adipic acid solution. When a niobium oxide dielectric material is obtained by chemically forming the niobium electrode in an electrolytic solution, the capacitor of the present invention is an electrolytic capacitor and the niobium electrode serves as an anode.

In the capacitor of the present invention, the another part electrode (counter electrode) coupled with the niobium sintered body is not particularly limited and, for example, at least one material (compound) selected from electrolytic solutions, organic semiconductors and inorganic semiconductors known in the art of aluminum electrolytic capacitor, may be used.

Specific examples of the electrolytic solution include a dimethylformamide-ethylene glycol mixed solution having dissolved therein 5 mass % of an isobutyltripropylammonium borotetrafluoride electrolyte, and a propylene carbonate-ethylene glycol mixed solution having dissolved therein 7 mass % of tetraethylammonium borotetrafluoride.

Specific examples of the organic semiconductor include an organic semiconductor comprising a benzene-pyrroline tetramer and chloranile, an organic semiconductor mainly comprising tetrathiotetracene, an organic semiconductor mainly comprising tetracyanoquinodimethane, and an electrically conducting polymer comprising a repeating unit represented by the following formula (1) or (2):

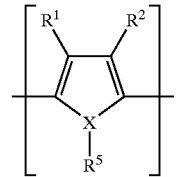

(1)

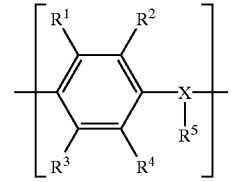

(2)

wherein $R^1$ to $R^4$ each independently represents a monovalent group selected from the group consisting of a hydrogen atom, a linear or branched, saturated or unsaturated alkyl, alkoxy or alkylester group having from 1 to 10 carbon atoms, a halogen atom, a nitro group, a cyano group, a primary, secondary or tertiary amino group, a $CF_3$ group, a phenyl group and a substituted phenyl group; the hydrocarbon chains of $R^1$ and $R^2$, or $R^3$ and $R^4$ may combine with each other at an arbitrary position to form a divalent chain for forming at least one 3-, 4-, 5-, 6- or 7-membered saturated or unsaturated hydrocarbon cyclic structure together with the carbon atoms substituted by $R^1$ and $R^2$ or by $R^3$ and $R^4$; the cyclic combined chain may contain a bond of carbonyl, ether, ester, amide, sulfide, sulfinyl, sulfonyl or imino at an arbitrary position; X represents an oxygen atom, a sulfur atom or a nitrogen atom; and $R^5$ is present only when X is a nitrogen atom, and independently represents a hydrogen atom or a linear or branched, saturated or unsaturated alkyl group having from 1 to 10 carbon atoms.

In the present invention, $R^1$ to $R^4$ in formula (1) or (2) each independently represents preferably a hydrogen atom or a linear or branched, saturated or unsaturated alkyl or alkoxy group having from 1 to 6 carbon atoms, and each of the pairs $R^1$ and $R^2$, and $R^3$ and $R^4$ may combine to form a ring.

In the present invention, the electrically conducting polymer containing a repeating unit represented by formula (1) is preferably an electrically conducting polymer containing a structure unit represented by the following formula (3) as a repeating unit:

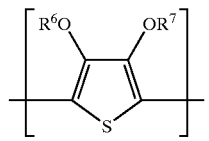

(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position; and the cyclic structure includes a structure having a vinylene bond which may be substituted, and a phenylene structure which may be substituted.

The electrically conducting polymer containing such a chemical structure bears electrical charge and is doped with a dopant. For the dopant, known dopants can be used without limitation.

Specific examples of the inorganic semiconductor include an inorganic semiconductor mainly comprising lead dioxide or manganese dioxide, and an inorganic semiconductor comprising triiron tetraoxide. These semiconductors may be used individually or in combination of two or more thereof.

Examples of the polymer containing a repeating unit represented by formula (1) or (2) include polyaniline, polyoxyphenylene, polyphenylene sulfide, polythiophene, polyfuran, polypyrrole, polymethylpyrrole, and substitution derivatives and copolymers thereof. Among these, preferred are polypyrrole, polythiophene and substitution derivatives thereof (e.g., poly(3,4-ethylenedioxythiophene)).

When the organic or inorganic semiconductor used has an electrical conductivity of $10^{-2}$ to $10^3$ S/cm, the capacitor produced can have a smaller impedance value and can be more increased in the capacitance at a high frequency.

The electrically conducting polymer layer is produced, for example, by a method of polymerizing a polymerizable compound such as aniline, thiophene, furan, pyrrole, methylpyrrole or a substitution derivative thereof under the action of an oxidizing agent capable of satisfactorily bringing about an oxidation reaction of dehydrogenative two-electron oxidation. Examples of the polymerization reaction of the polymerizable compound (monomer) include vapor phase polymerization and solution polymerization. The electrically conducting polymer layer is formed on the surface of the niobium sintered body having thereon a dielectric material. In the case where the electrically conducting polymer is an organic solvent-soluble polymer capable of solution coating, a method of coating the polymer on the surface of the sintered body to form an electrically conducting polymer layer is used.

One preferred example of the production method by solution polymerization is a method of dipping the niobium sintered body having formed thereon a dielectric layer in a solution containing an oxidizing agent (Solution 1) and subsequently dipping the sintered body in a solution containing a monomer and a dopant (Solution 2), thereby performing the polymerization to form an electrically conducting polymer layer on the surface of the sintered body. Also, the sintered body may be dipped in Solution 1 after it is dipped in Solution 2. Solution 2 used in the above-described method may be a monomer solution not containing a dopant. In the case of using a dopant, the dopant may be allowed to be present together in the solution containing an oxidizing agent. The operation of performing these polymerization steps is repeated once or more, preferably from 3 to 20 times, for the niobium sintered body having thereon a dielectric material, whereby a dense and stratified electrically conducting polymer layer can be easily formed.

In the production method of a capacitor of the present invention, any oxidizing agent may be used insofar as it does not adversely affect the capacitor performance and the reductant of the oxidizing agent can work out to a dopant and elevate the electrical conductivity of the electrically conducting polymer. An industrially inexpensive compound easy to handle at the production is preferred.

Specific examples of such an oxidizing agent include Fe(III)-base compounds such as $FeCl_3$, $FeClO_4$ and Fe (organic acid anion) salt; anhydrous aluminum chloride/cupurous chloride; alkali metal persulfates; ammonium persulfates; peroxides; manganeses such as potassium permanganate; quinines such as 2,3-dichloro-5,6-dicyano-1,4-benzoquinone (DDQ), tetrachloro-1,4-benzoquinone and tetracyano-1,4-benzoquinone; halogens such as iodine and bromine; peracid; sulfonic acids such as sulfuric acid, fuming sulfuric acid, sulfur trioxide, chlorosulfuric acid, fluorosulfuric acid and amidosulfuric acid; ozone; and a mixture of a plurality of these oxidizing agents.

Examples of the fundamental compound of the organic acid anion for forming the above-described Fe (organic acid anion) salt include organic sulfonic acid, organic carboxylic acid, organic phosphoric acid and organic boric acid. Specific examples of the organic sulfonic acid include benzenesulfonic acid, p-toluenesulfonic acid, methanesulfonic acid, ethanesulfonic acid, α-sulfonaphthalene, β-sulfonaphthalene, naphthalenedisulfonic acid and alkylnaphthalenesulfonic acid (examples of the alkyl group include butyl, triisopropyl and di-tert-butyl).

Specific examples of the organic carboxylic acid include acetic acid, propionic acid, benzoic acid and oxalic acid. Furthermore, polymer electrolyte anions such as polyacrylic acid, polymethacrylic acid, polystyrene-sulfonic acid, polyvinylsulfonic acid, polyvinylsulfuric acid, poly-α-methylsulfonic acid, polyethylenesulfonic acid and polyphosphoric acid may also be used in the present invention. These organic sulfuric acids and organic carboxylic acids are mere examples and the present invention is not limited thereto. Examples of the counter cation for the above-described anion include $H^+$, alkali metal ions such as $Na^+$ and $K^+$, and ammonium ions substituted by a hydrogen atom, a tetramethyl group, a tetraethyl group, a tetrabutyl group or a tetraphenyl group, however, the present invention is not limited thereto. Among these oxidizing agents, preferred are oxidizing agents containing a trivalent Fe-base compound, a cuprous chloride, an alkali persulfate, an ammonium persulfate or a quinone.

For the anion having a dopant ability which is allowed to be present together, if desired, in the production of a polymer composition for the electrically conducting polymer (anion other than the reductant anion of the oxidizing agent), an electrolyte anion having as a counter anion an oxidizing agent anion (reductant of oxidizing agent) produced from the above-described oxidizing agent, or other electrolyte anion may be used. Specific examples thereof include protonic acid anions including halide anion of Group 5B elements, such as $PF_6^-$, $SbF_6^-$ and $AsF_6^-$; halide anion of Group 3B elements, such as $BF_4^-$; halogen anion such as $I^-(I_3^-)$, $Br^-$ and $Cl^-$; perhalogenate anion such as $ClO_4^-$; Lewis acid anion such as $AlCl_4^-$, $FeCl_4^-$ and $SnCl_5^-$; inorganic acid anion such as $NO_3^-$ and $SO_4^{2-}$; sulfonate anion such as p-toluenesulfonic acid, naphthalenesulfonic acid and alkyl-substituted naphthalene-sulfonic acid having from 1 to 5 carbon atoms; organic sulfonate anion such as $CF_3SO_3^-$ and $CH_3SO_3^-$; and carboxylate anion such as $CH_3COO^-$ and $C_6H_5COO^-$.

Other examples include polymer electrolyte anions such as polyacrylic acid, polymethacrylic acid, polystyrenesulfonic acid, polyvinylsulfonic acid, polyvinylsulfuric acid, poly-α-methylsulfonic acid, polyethylenesulfonic acid and polyphosphoric acid. However, the present invention is not limited thereto. Among these anions, preferred is a high molecular or low molecular organic sulfonic acid compound or polyphosphoric acid compound. An aromatic sulfonic acid compound (e.g., sodium dodecylbenzenesulfonate, sodium naphthalenesulfonate) is preferably used as the anion-donating compound.

Among the organic sulfonate anions, more effective dopants are a sulfoquinone compound having one or more sulfo-anion group ($—SO_3^-$) and a quinone structure within the molecule, and an anthracene sulfonate anion.

Examples of the fundamental skeleton for the sulfoquinone anion of the above-described sulfoquinone compound include p-benzoquinone, o-benzoquinone, 1,2-naphthoquinone, 1,4-naphthoquinone, 2,6-naphthoquinone, 9,10-anthraquinone, 1,4-anthraquinone, 1,2-anthraquinone, 1,4-chrysenquinone, 5,6-chrysenquinone, 6,12-chrysenquinone, acenaphthoquinone, acenaphthenequinone, camphorquinone, 2,3-bornanedione, 9,10-phenanthrenequinone and 2,7-pyrenequinone.

In the case where the another part electrode is solid, an electrically conducting layer may be provided thereon so as to attain good electrical contact with an external outgoing lead (for example, lead frame) which is used, if desired.

The electrically conducting layer can be formed using, for example, solidification of an electrically conducting paste, plating, vapor deposition of metal or a heat-resistant electrically conducting resin film. Preferred examples of the electrically conducting paste include silver paste, copper paste, aluminum paste, carbon paste and nickel paste. These pastes may be used individually or in combination of two or more thereof. In the case of using two or more kinds of pastes, the pastes may be mixed or may be superposed one on another as separate layers. The electrically conducting paste applied is then solidified by allowing it to stand in air or under heating. Examples of the plating include nickel plating, copper plating, silver plating and aluminum plating. Examples of the metal vapor-deposited include aluminum, nickel, copper and silver.

More specifically, for example, aluminum paste and silver paste are stacked in this order on the second electrode and these are molded with a material such as epoxy resin, whereby a capacitor is fabricated. This capacitor may have a niobium or tantalum lead which is sintered and molded integrally with the niobium sintered body or welded afterward.

The thus-fabricated capacitor of the present invention is jacketed using, for example, resin mold, resin case, metallic jacket case, dipping of resin or laminate film, and then used as a capacitor product for various uses.

In the case where the another part electrode is liquid, the capacitor fabricated from the above-described two electrodes and dielectric material is housed, for example, in a can electrically connected to the another part electrode to complete the capacitor. In this case, the electrode side of the niobium sintered body is guided outside through a niobium or tantalum lead described above and at the same time, insulated from the can using an insulating rubber or the like.

By producing a sintered body for capacitors using the niobium hydride powder, niobium hydride alloy powder, niobium powder, niobium alloy powder or a granulated product thereof produced according to the practical embodiment of the present invention described in the foregoing pages and producing a capacitor from the sintered body, a capacitor having a small leakage current and good reliability can be obtained.

BEST MODE FOR CARRYING OUT THE INVENTION

The present invention is described in greater detail below by referring to Examples and Comparative Examples, however, the present invention is not limited to these Examples.

In Examples and Comparative Examples, the capacitance and leakage current of the sintered body produced from the above-described powder or granulated product having desired physical properties (this sintered body is hereinafter referred to as "a niobium sintered body", "a niobium alloy sintered body" or simply "a sintered body"), and the capacitance and leakage current of the capacitor worked into a chip were measured by the following methods.

(1) Measurement of Capacitance of Sintered Body

A sintered body having formed thereon a dielectric layer, and an electrode formed of a tantalum material were dipped in 30 mass % sulfuric acid at room temperature and by connecting each to a measuring device (Precision LCR Meter Model HP4284A) manufactured by Hewlett-Packard, the capacitance at 120 Hz was measured. The measured value per mass of the sintered body was designated as the capacitance (unit: $\mu F \cdot V/g$) of the sintered body.

(2) Measurement of Leakage Current of Sintered Body

A sintered body having formed thereon a dielectric layer, as an anode, and a cathode were dipped in an aqueous 20 mass % phosphoric acid solution at room temperature and after a d.c. current of 14 V was continuously applied for 3 minutes, a current value was measured. The measured value per mass of the sintered body was designated as the leakage current value (LC value, unit: $\mu A/g$) of the sintered body.

(3) Measurement of Capacitance of Capacitor

The LCR meter manufactured by Hewlett-Packard was connected between terminals of a manufactured chip at room temperature and the measured capacitance at 120 Hz was designated as the capacitance of the capacitor worked into a chip.

(4) Measurement of Leakage Current of Capacitor

The current value measured after continuously applying a d.c. voltage of 6.3 V between terminals of a manufactured chip for 1 minute at room temperature was designated as the leakage current value of the capacitor worked into a chip.

(5) Measurement of Particle Size

The particle size distribution was measured by the laser diffraction scattering method using HRA 9320-X100 manufactured by Microtrac. The particle size value ($D_{50}$; $\mu m$) when the accumulated vol % corresponded to 50 vol % was designated as the average particle size.

EXAMPLE 1

In an SUS 304-made reactor, 1,000 g of a niobium ingot was placed. Thereinto, hydrogen was continuously introduced at 400° C. for 10 hours and after cooling to room temperature, the hydrogenated niobium lump was coarsely ground by a hammer crusher in an argon atmosphere to obtain a niobium hydride coarse powder having a particle size of 0.5 mm or less. Subsequently, the niobium hydride coarse powder was wet ground over 6 hours using zirconia-made beads having a particle size of 1 mm as a grinding medium and a degassed methanol as a dispersion medium while lowering the grinding temperature from 10° C. to −40° C. to obtain a methanol slurry of niobium hydride powder. The slurry was dried at 40° C. under reduced pressure and thereby, a niobium hydride powder was obtained. This powder material had an average particle size of 0.9 μm and an oxygen concentration of 1.2 mass %. The thus-obtained niobium hydride powder was dehydrogenated under heating at $1\times10^{-2}$ Pa and 400° C. for 4 hours and then, cooled to room temperature. The resulting niobium powder was nitrided at 300° C. for 2 hours by introducing nitrogen in an atmospheric pressure. Thereafter, the niobium powder was sintered under reduced pressure of $4\times10^{-3}$ Pa at 1,100° C. for 2 hours and then cooled to room temperature. The obtained niobium lump was cracked to obtain a niobium granulated powder. This granulated powder had an average particle size of 110 μm and an oxygen content of 1.8 mass %.

The thus-obtained niobium granulated powder was molded together with a 0.3-mmφ niobium wire to manufacture a molded article (about 0.1 g) having a size of approximately 0.3 cm×0.18 cm×0.45 cm.

This molded article was allowed to stand under reduced pressure of $4\times10^{-3}$ Pa at 1,250° C. for 30 minutes and thereby, a sintered body was obtained. The sintered body obtained was electrochemically formed in an aqueous 0.1 mass % phosphoric acid solution at a temperature of 80° C. for 6 hours by applying a voltage of 20 V to form a dielectric layer on the surface. Thereafter, the capacitance in 30 mass % sulfuric acid and the leakage current in an aqueous 20 mass % phosphoric acid solution were measured. The results obtained are shown in Table 1.

EXAMPLES 2 TO 5

Niobium powders and subsequently granulated powders were produced in the same manner as in Example 1 by changing the dispersion medium and the temperature at the grinding.

Each of the thus-obtained niobium granulated powders was molded together with a 0.3-mmφ niobium wire to manufacture molded articles (about 0.1 g) having a size of approximately 0.3 cm×0.18 cm×0.45 cm. These molded articles were allowed to stand under reduced pressure of $4\times10^{-3}$ Pa at 1,250° C. for 30 minutes to obtain sintered bodies. Each sintered body was electrochemically formed in an aqueous 0.1 mass % phosphoric acid solution at a temperature of 80° C. for 6 hours by applying a voltage of 20 V to form a dielectric layer on the surface. Thereafter, the capacitance in 30 mass % sulfuric acid and the leakage current in an aqueous 20 mass % phosphoric acid solution were measured. The results obtained are shown in Table 1.

EXAMPLES 6 TO 16

In an SUS 304-made reactor, 1,000 g of a niobium alloy ingot of various types was placed. Thereinto, hydrogen was continuously introduced at 400° C. for 10 hours and after cooling to room temperature, the hydrogenated niobium alloy lump was coarsely ground by a hammer crusher in an argon atmosphere to obtain a coarse powder having a particle size of 0.5 mm or less. Subsequently, the niobium hydride alloy coarse powder was wet ground over from 6 to 10 hours using zirconia-made beads having a particle size of 1 mm as a grinding medium and a degassed ethanol as a dispersion medium while lowering the grinding temperature from 10° C. to −30° C. to obtain an ethanol slurry of niobium hydride alloy powder. The resulting slurry was dried at 40° C. under reduced pressure and thereby, a niobium hydride alloy powder was obtained. The thus-obtained niobium hydride alloy powder was dehydrogenated under heating at $1\times10^{-2}$ Pa and 400° C. for 4 hours, then sintered under reduced pressure of $4\times10^{-3}$ Pa at 100° C. for 2 hours and thereafter, cooled to room temperature. The niobium alloy lump obtained was cracked to obtain a niobium alloy granulated powder.

Each niobium granulated powder obtained was molded together with a 0.3-mmφ niobium wire to manufacture a molded article (about 0.1 g) having a size of approximately 0.3 cm×0.18 cm×0.45 cm.

These molded articles were allowed to stand under reduced pressure of $4\times10^{-3}$ Pa at 1,250° C. for 30 minutes and thereby, sintered bodies were obtained. Each sintered body was electrochemically formed in an aqueous 0.1 mass % phosphoric acid solution at a temperature of 80° C. for 6 hours by applying a voltage of 20 V to form a dielectric layer on the surface. Thereafter, the capacitance in 30 mass % sulfuric acid and the leakage current in an aqueous 20 mass % phosphoric acid solution were measured. The results obtained are shown in Table 1.

COMPARATIVE EXAMPLE 1

In an SUS 304-made reactor, 1,000 g of a niobium ingot was placed. Thereinto, hydrogen was continuously introduced at 400° C. for 10 hours and after cooling to room temperature, the hydrogenated niobium lump was coarsely ground by a hammer crusher in an argon atmosphere to obtain a coarse powder having a particle size of 0.5 mm or less. Subsequently, the niobium hydride coarse powder was wet ground over 6 hours using zirconia-made beads having a particle size of 1 mm as a grinding medium and a degassed ethanol as a dispersion medium while elevating the grinding temperature from 40 to 70° C. to obtain an ethanol slurry of niobium hydride powder. The resulting slurry was dried at 40° C. under reduced pressure and thereby, a niobium hydride powder was obtained. This powder material had an average particle size of 0.9 μm and an oxygen concentration of 6.3 mass %. The thus-obtained niobium hydride powder was dehydrogenated under heating at $1\times10^{-2}$ Pa and 400° C. for 4 hours and then, cooled to room temperature. The resulting niobium powder was nitrided at 300° C. for 2 hours by introducing nitrogen in an atmospheric pressure. Thereafter, the niobium powder was sintered under reduced pressure of $4\times10^{-3}$ Pa at 1,100° C. for 2 hours and then cooled to room temperature. The obtained niobium lump was cracked to obtain a niobium granulated powder. This granulated powder had an average particle size of 110 μm and an oxygen content of 6.8 mass %.

The obtained niobium granulated powder was molded together with a 0.3-mmφ niobium wire to manufacture a molded article (about 0.1 g) having a size of approximately 0.3 cm×0.18 cm×0.45 cm. This molded article was allowed to stand under reduced pressure of $4\times10^{-3}$ Pa at 1,250° C. for 30 minutes and thereby, a sintered body was obtained. The sintered body obtained was electrochemically formed in an aqueous 0.1 mass % phosphoric acid solution at a temperature of 80° C. for 6 hours by applying a voltage of 20 V to form a dielectric layer on the surface. Thereafter, the capacitance in 30 mass % sulfuric acid and the leakage current in an aqueous 20 mass % phosphoric acid solution were measured. The results obtained are shown in Table 1.

COMPARATIVE EXAMPLES 2 AND 3

In Comparative Examples 2, the coarse powder was ground in the same manner as in Example 2 except for keeping the grinding temperature at 40° C.

In Comparative Examples 3, the coarse powder was ground in the same manner as in Example 6 except for elevating the grinding temperature from −30 to 10° C. Subsequently, granulation and sintering were performed in the same manner as in Example 2 or Example 6. Each sintered body obtained was electrochemically formed in an aqueous 0.1 mass % phosphoric acid solution at a temperature of 80° C. for 6 hours by applying a voltage of 20 V to form a dielectric layer on the surface. Thereafter, the capacitance in 30 mass % sulfuric acid and the leakage current in an aqueous 20 mass % phosphoric acid solution were measured. The results obtained are shown in Table 1.

EXAMPLES 17 AND 18

50 Units of each sintered body were prepared in Example 17 and Example 18 in the same manner as in Example 1 and Example 6, respectively. These sintered bodies each was electrochemically formed using an aqueous 0.1% phosphoric acid solution at a voltage of 20 V for 200 minutes to form an oxide dielectric film on the surface. Subsequently, an operation of dipping the sintered body in an aqueous 60 mass % manganese nitrate solution and then heating it at 220° C. for 30 minutes was repeated to form a manganese dioxide layer as the another part electrode layer on the oxide dielectric film. On this another part electrode layer, a carbon layer and a silver paste layer were stacked in this order. After mounting a lead frame thereon, the device as a whole was molded with an epoxy resin to manufacture a chip-type capacitor. The average capacitance and the average LC value of the chip-type capacitors (n=50 units) are shown in Table 2. The LC value is a value measured at room temperature by applying a voltage of 6.3 V for 1 minute.

EXAMPLES 19 AND 20

50 Units of each sintered body were prepared in Example 19 and Example 20 in the same manner as in Example 2 and Example 8, respectively. These sintered bodies each was electrochemically formed using an aqueous 0.1 mass % phosphoric acid solution at a voltage of 20 V for 200 minutes to form an oxide dielectric film on the surface. Subsequently, an operation of contacting the oxide dielectric film with an equivalent mixed solution of an aqueous 10 mass % ammonium persulfate solution and an aqueous 0.5 mass % anthraquinonesulfonic acid solution and then with a pyrrole vapor was repeated at least 5 times to form another part electrode (counter electrode) comprising polypyrrole on the oxide dielectric film.

TABLE 1

| | Species of Sintered Body | Other Component | Content of Other Component (ppm) | Dispersion Medium | Temperature at Start of Grinding (° C.) | Temperature at Finish of Grinding (° C.) | Grinding Time (hr) | Average Particle Size of Ground Powder (μm) | Oxygen Concentration of Ground Powder (ppm) | CV (μFV/g) | LC (μA/g) |
|---|---|---|---|---|---|---|---|---|---|---|---|
| Example 1 | Nb | nitrogen | 2000 | methanol | 10 | −40 | 6 | 0.9 | 12000 | 95000 | 20 |
| Example 2 | Nb | nitrogen | 2500 | water | 10 | 5 | 9 | 0.8 | 13000 | 105000 | 24 |
| Example 3 | Nb | nitrogen | 2000 | liquid nitrogen | −196 | −196 | 7 | 0.7 | 7000 | 120000 | 18 |
| Example 4 | Nb | nitrogen | 2500 | ethyl acetate | 0 | −30 | 5 | 1.0 | 12000 | 85000 | 13 |
| Example 5 | Nb | nitrogen | 2200 | acetone | −15 | −40 | 10 | 0.8 | 11000 | 103000 | 21 |
| Example 6 | Nb—Zr alloy | zirconium | 10000 | ethanol | 10 | −30 | 6 | 0.8 | 9000 | 120000 | 15 |
| Example 7 | Nb—Nd alloy | neodymium | 5500 | ethanol | 10 | −30 | 7 | 0.8 | 14000 | 119000 | 18 |
| Example 8 | Nb—W alloy | tungsten | 20000 | ethanol | 10 | −30 | 6 | 0.9 | 13000 | 107000 | 20 |
| Example 9 | Nb—Sb alloy | antimony | 12000 | ethanol | 10 | −30 | 10 | 1.0 | 14000 | 99000 | 13 |
| Example 10 | Nb—B alloy | boron | 2000 | ethanol | 10 | −30 | 8 | 0.8 | 12000 | 119000 | 19 |
| Example 11 | Nb—Al alloy | aluminum | 3900 | ethanol | 10 | −30 | 6 | 0.8 | 12000 | 121000 | 18 |
| Example 12 | Nb—Zn alloy | zinc | 500 | ethanol | 10 | −30 | 6 | 0.9 | 13000 | 104000 | 15 |
| Example 13 | Nb—Si—Y alloy | silicon, yttrium | 100000 9000 | ethanol | 10 | −30 | 10 | 0.9 | 20000 | 110000 | 26 |
| Example 14 | Nb—Zr—Ga alloy | zirconium, gallium | 10000 3000 | ethanol | 10 | −30 | 6 | 0.8 | 11000 | 120000 | 16 |
| Example 15 | Nb—Ti—Te alloy | titanium, tellurium | 500 13000 | ethanol | 10 | −30 | 6 | 0.8 | 12000 | 117000 | 20 |
| Example 16 | Nb—Sn—Mn alloy | tin, manganese | 12000 400 | ethanol | 10 | −30 | 10 | 0.9 | 14000 | 109000 | 20 |
| Comparative Example 1 | Nb | nitrogen | 2100 | ethanol | 40 | 70 | 6 | 0.9 | 63000 | 94000 | 85 |
| Comparative Example 2 | Nb | nitrogen | 2600 | water | 40 | 40 | 9 | 0.8 | 60000 | 103000 | 105 |
| Comparative Example 3 | Nb-Zr alloy | zirconium | 10000 | ethanol | −30 | 10 | 6 | 0.8 | 55000 | 115000 | 79 |

On this another part electrode, a carbon layer and a silver paste layer were stacked in this order. After mounting a lead frame thereon, the device as a whole was molded with an epoxy resin to manufacture a chip-type capacitor. The average capacitance and the average LC value of the chip-type capacitors (n=50 units) are shown in Table 2. The LC value is a value measured at room temperature by applying a voltage of 6.3 V for 1 minute.

EXAMPLES 21 AND 22

50 Units of each sintered body were prepared in Example 21 and Example 22 in same manner as in Example 3 and Example 10, respectively. These sintered bodies each was electrochemically formed using an aqueous 0.1% phosphoric acid solution at a voltage of 20 V for 200 minutes to form an oxide dielectric film on the surface. Subsequently, the sintered body was dipped in an aqueous solution containing 25 mass % of ammonium persulfate (Solution 1), then pulled up and dried at 80° C. for 30 minutes. Thereafter, the sintered body having formed thereon a dielectric material was dipped in an isopropanol solution containing 18 mass % of 3,4-ethylenedioxythiophene (Solution 2), then pulled up and left standing in an atmosphere of 60° C. for 10 minutes to allow the oxidation-polymerization to proceed. The resulting sintered body was again dipped in Solution 1 and then treated in the same manner as above. The operation from the dipping in Solution 1 until the oxidation polymerization was repeated 8 times. Then, the sintered body was washed with hot water at 50° C. for 10 minutes and dried at 100° C. for 30 minutes, whereby another part electrode (counter electrode) comprising electrically conducting poly (3,4-ethylenedioxy-thiophene) was formed.

On this another part electrode, a carbon layer and a silver paste layer were stacked in this order. After mounting a lead frame thereon, the device as a whole was molded with an epoxy resin to manufacture a chip-type capacitor. The average capacitance and the average LC value of the chip-type capacitors (n=50 units) are shown in Table 2. The LC value is a value measured at room temperature by applying a voltage of 6.3 V for 1 minute.

COMPARATIVE EXAMPLES 4 AND 5

50 Units of each sintered body were prepared in Comparative Example 4 and Comparative Example 5 in the same manner as in Comparative Example 1 and Comparative Example 3, respectively. These sintered bodies each was electro-chemically formed using an aqueous 0.1% phosphoric acid solution at a voltage of 20 V for 200 minutes to form an oxide dielectric film on the surface. Subsequently, the niobium sintered body was dipped in an aqueous solution containing 25 mass % of ammonium persulfate (Solution 1), then pulled up and dried at 80° C. for 30 minutes. Thereafter, the sintered body having formed thereon a dielectric material was dipped in an isopropanol solution containing 18 mass % of 3,4-ethylenedioxythiophene (Solution 2), then pulled up and left standing in an atmosphere of 60° C. for 10 minutes to allow the oxidation-polymerization to proceed. The resulting sintered body was again dipped in Solution 1 and then treated in the same manner as above. The operation from the dipping in Solution 1 until the oxidation polymerization was repeated 8 times. Then, the sintered body was washed with hot water at 50° C. for 10 minutes and dried at 100° C. for 30 minutes, whereby another part electrode (counter electrode) comprising electrically conducting poly (3,4-ethylenedioxythiophene) was formed.

On this another part electrode, a carbon layer and a silver paste layer were stacked in this order. After mounting a lead frame thereon, the device as a whole was molded with an epoxy resin to manufacture a chip-type capacitor. The average capacitance and the average LC value of the chip-type capacitors (n=50 units) are shown in Table 2. The LC value is a value measured at room temperature by applying a voltage of 6.3 V for 1 minute.

TABLE 2

| | Capacitance ($\mu$F) | LC ($\mu$A) | Number of Units having LC Exceeding 100 $\mu$A |
|---|---|---|---|
| Example 17 | 428 | 17 | 0 |
| Example 18 | 540 | 15 | 0 |
| Example 19 | 462 | 22 | 0 |
| Example 20 | 492 | 21 | 0 |
| Example 21 | 528 | 18 | 0 |
| Example 22 | 541 | 21 | 0 |
| Comparative Example 4 | 413 | 92 | 23 |
| Comparative Example 5 | 523 | 89 | 17 |

INDUSTRIAL APPLICABILITY

There are provided a niobium powder for capacitors, having a low oxygen content, which is obtained by grinding niobium hydride or niobium hydride alloy at a temperature of −200 to 30° C. in the presence of a dispersion medium; a niobium granulated product for capacitors, having an average particle size of 10 to 500 $\mu$m, which is obtained by granulating the niobium powder for capacitors; a sintered body obtained by sintering the niobium powder or granulated powder for capacitors; a capacitor having good LC characteristics and less dispersed in the LC characteristics, which is fabricated by forming a dielectric material on the surface of the sintered body and providing another part electrode on the dielectric material; and production methods therefor.

What is claimed is:

1. A process for producing a niobium powder for capacitors, comprising a step of grinding a niobium hydride or a niobium hydride alloy in the presence of a dispersion medium, wherein the grinding temperature is from −200 to 30° C.

2. The process for producing a niobium powder for capacitors as claimed in claim 1, which comprises a step of dehydrogenating the niobium hydride powder or niobium hydride alloy powder at a temperature of 100 to 1,000° C. after the grinding.

3. The process for producing a niobium powder for capacitors as claimed in claim 1, wherein the grinding temperature does not elevate during the grinding.

4. The process for producing a niobium powder for capacitors as claimed in claim 1, wherein the dispersion medium is at least one member selected from the group consisting of water, an organic solvent and a liquefied gas.

5. A niobium powder for capacitors, obtained by a process comprising a step of grinding a niobium hydride or a niobium hydride alloy in the presence of a dispersion medium, wherein the grinding temperature is from −200 to 30° C., wherein the pore size peak of the niobium powder for capacitors is from 0.01 to 7 $\mu$m, and wherein the bulk density of the niobium powder for capacitors is from 0.5 to 4 g/ml.

6. A niobium powder for capacitors, obtained by a process comprising a step of grinding a niobium hydride or a niobium hydride alloy in the presence of a dispersion medium, wherein the grinding temperature is from −200 to 30° C., wherein the pore size peak of the niobium powder for capacitors is from 0.01 to 7 μm, and wherein the oxygen content of the niobium powder for capacitors is 2.5 mass % or less.

7. A niobium granulated product for capacitors, having an average particle size of 10 to 500 μm, which is obtained by granulating the niobium powder for capacitors obtained by a production process comprising a step of grinding a niobium hydride or a niobium hydride alloy in the presence of a dispersion medium, wherein the grinding temperature is from −200 to 30° C., and wherein the bulk density of the niobium granulated product for capacitors is from 0.05 to 4 g/ml.

8. A niobium granulated product for capacitors, having an average particle size of 10 to 500 μm, which is obtained by granulating the niobium powder for capacitors obtained by a production process comprising a step of grinding a niobium hydride or a niobium hydride alloy in the presence of a dispersion medium, wherein the grinding temperature is from −200 to 30° C., and wherein the oxygen concentration of the niobium granulated product for capacitors is 3 mass % or less.

* * * * *